(12) United States Patent
Snider

(10) Patent No.: US 10,960,954 B1
(45) Date of Patent: Mar. 30, 2021

(54) BIKE PEDAL SHOE PLATFORM APPARATUS

(71) Applicant: Jerry Snider, Taylor, MI (US)

(72) Inventor: Jerry Snider, Taylor, MI (US)

( * ) Notice: Subject to any disclaimer, the term of this patent is extended or adjusted under 35 U.S.C. 154(b) by 0 days.

(21) Appl. No.: 16/997,390

(22) Filed: Aug. 19, 2020

(51) Int. Cl.
*B62M 3/08* (2006.01)
*G05G 1/487* (2008.04)
*A63B 21/00* (2006.01)

(52) U.S. Cl.
CPC ............ *B62M 3/086* (2013.01); *G05G 1/487* (2013.01); *A63B 21/4015* (2015.10)

(58) Field of Classification Search
CPC .......... B62M 3/08; B62M 3/086; B62M 3/16; G05G 1/48; G05G 1/483; G05G 1/487; G05G 1/54; A63B 21/4015
See application file for complete search history.

(56) References Cited

U.S. PATENT DOCUMENTS

| | | | |
|---|---|---|---|
| 2,641,249 A * | 6/1953 | Brockman | A63B 22/0046 601/36 |
| 4,361,972 A | 12/1982 | Miller | |
| 4,599,914 A | 7/1986 | Dunn | |
| 4,662,090 A | 5/1987 | Solano | |
| 4,856,211 A | 8/1989 | Phillips | |
| 4,876,808 A * | 10/1989 | Hsieh | A43B 5/14 36/131 |
| 4,915,375 A | 4/1990 | Ginsburg | |
| 6,231,485 B1 * | 5/2001 | Dreissigacker | A63B 21/227 482/57 |
| 7,730,806 B1 * | 6/2010 | Grimaldi | G05G 1/483 74/562 |
| D671,039 S | 11/2012 | Deng | |
| 8,919,222 B2 | 12/2014 | Scheiman | |
| 10,730,583 B2 * | 8/2020 | Donahue | B62M 3/083 |
| 2006/0048599 A1 | 3/2006 | Wald | |

FOREIGN PATENT DOCUMENTS

| EP | 3098155 A1 * | 11/2016 | ............ B62M 3/086 |
|---|---|---|---|
| WO | WO2011139847 | 11/2011 | |

* cited by examiner

*Primary Examiner* — Adam D Rogers

(57) ABSTRACT

A bike pedal shoe platform apparatus for stabilizing a rider's foot on an exercise bike includes a platform dimensioned to receive the entirety of a user's shoe. A pair of mounting posts is coupled to the platform with each mounting post extending perpendicularly from a platform bottom side. A pedal holder is coupled to the pair of mounting posts. The pedal holder secures a pedal against the platform bottom side. A heel plate is coupled to the platform. The heel plate is coupled to the outer perimeter along the heel portion. A strap is coupled to the platform. The strap is coupled to the outer perimeter and extends from the insole portion to the outsole portion. The strap is adjustable to secure the user's shoe to the platform top side.

9 Claims, 5 Drawing Sheets ly pertains to a new pedal attachment device
for stabilizing a rider's foot on an exercise bike.
BIKE PEDAL SHOE PLATFORM APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pedal attachment devices and more particularly pertains to a new pedal attachment device for stabilizing a rider's foot on an exercise bike.

(2) Description of Related Art Including Information Disclosed Under 37 CFR 1.97 and 1.98

The prior art relates to pedal attachment devices. Existing devices may replace pedals entirely or serve as a combination shoe and pedal. Known devices lack an effective clamp to easily attach to an existing pedal to provide a shoe-shaped platform to stabilize the user's foot.

BRIEF SUMMARY OF THE INVENTION

An embodiment of the disclosure meets the needs presented above by generally comprising a platform having a platform top side, a platform bottom side, and an outer perimeter, the outer perimeter having a heel portion, a toe portion, an insole portion, and an outsole portion. The platform is dimensioned to receive the entirety of a user's shoe. A pair of mounting posts is coupled to the platform with each mounting post extending perpendicularly from the platform bottom side. A pedal holder is coupled to the pair of mounting posts. The pedal holder has a pair of receiving apertures selectively engageable with the pair of mounting posts. The pedal holder is configured to secure a pedal against the platform bottom side. A heel plate is coupled to the platform. The heel plate is coupled to the outer perimeter along the heel portion. A strap is coupled to the platform. The strap is coupled to the outer perimeter and extends from the insole portion to the outsole portion. The strap is adjustable and configured to secure the user's shoe to the platform top side.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
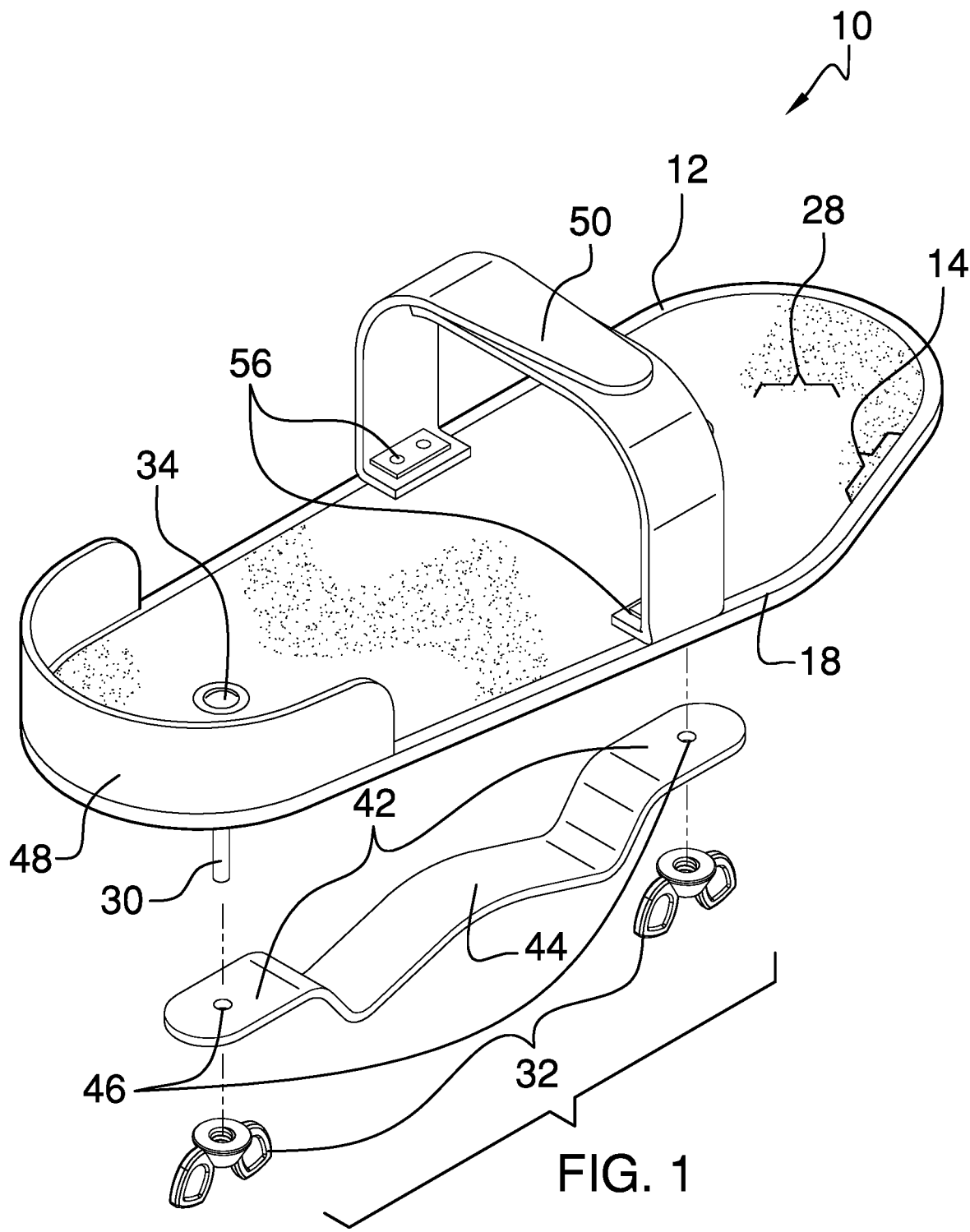
FIG. 1 is an isometric view of a bike pedal shoe platform apparatus according to an embodiment of the disclosure.
Figure 2:
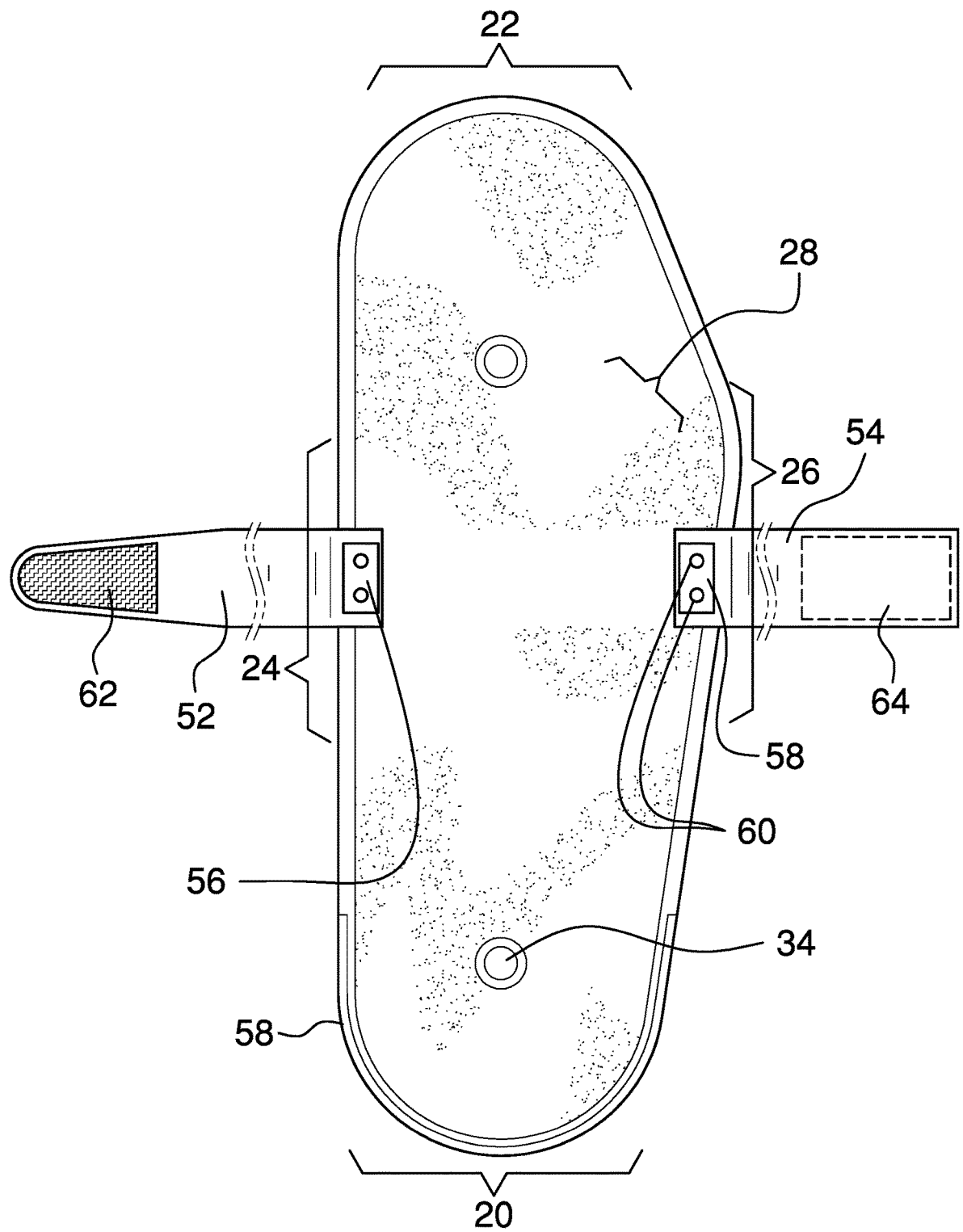
FIG. 2 is a top plan view of an embodiment of the disclosure.
Figure 3:
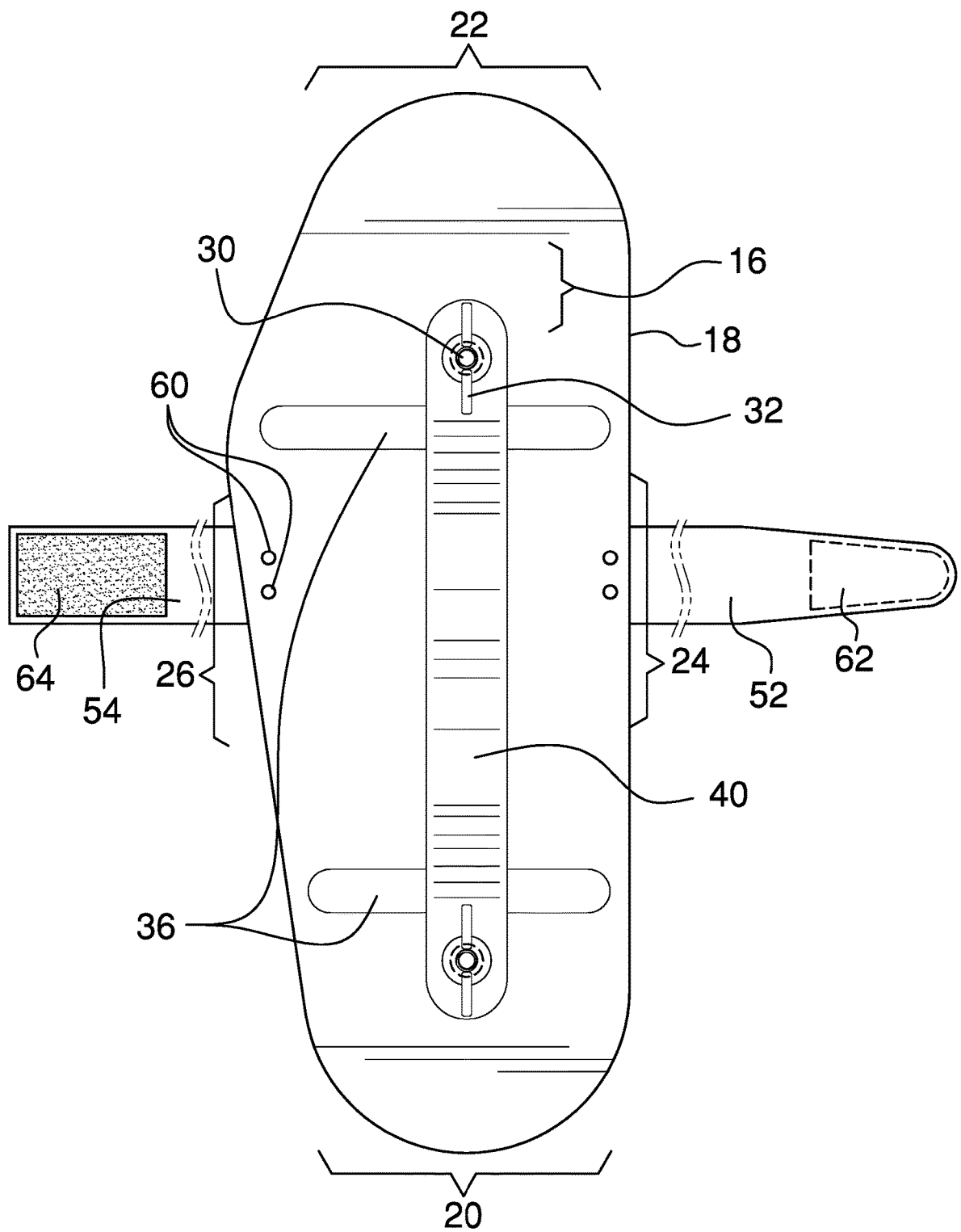
FIG. 3 is a bottom plan view of an embodiment of the disclosure.

With reference now to the drawings, and in particular to FIGS. 1 through 5 thereof, a new pedal attachment device embodying the principles and concepts of an embodiment of the disclosure and generally designated by the reference numeral 10 will be described.

As best illustrated in FIGS. 1 through 5, the bike pedal shoe platform apparatus 10 generally comprises a platform 12 having a platform top side 14, a platform bottom side 16, and an outer perimeter 18. The outer perimeter 18 has a heel portion 20, a toe portion 22, an insole portion 24, and an outsole portion 26. The platform 12 is dimensioned to receive the entirety of a user's shoe. A grip layer 28 is coupled to the platform 12. The grip layer 28 may be continuously coupled to the platform top side 14 excepting the outer perimeter 18.

A pair of mounting posts 30 is coupled to the platform 12. Each mounting post 30 extends perpendicularly from the platform bottom side 16. Each of the pair of mounting posts 30 may be threaded and may include a wing nut 32. Each mounting post 30 may extend through the platform 12 with a bolt head 34 securing the mounting post 30 against the platform top side 14 and an engagement nut 35 securing the mounting post 30 against the platform bottom side 16.

A pair of cross tabs 36 may be coupled to the platform 12. The pair of cross tabs 36 is coupled to the platform bottom side 16 between the pair of mounting posts 30. Each cross tab 36 may be obround and is configured to limit movement of a pedal 38 of an exercise bike.

Figure 4:
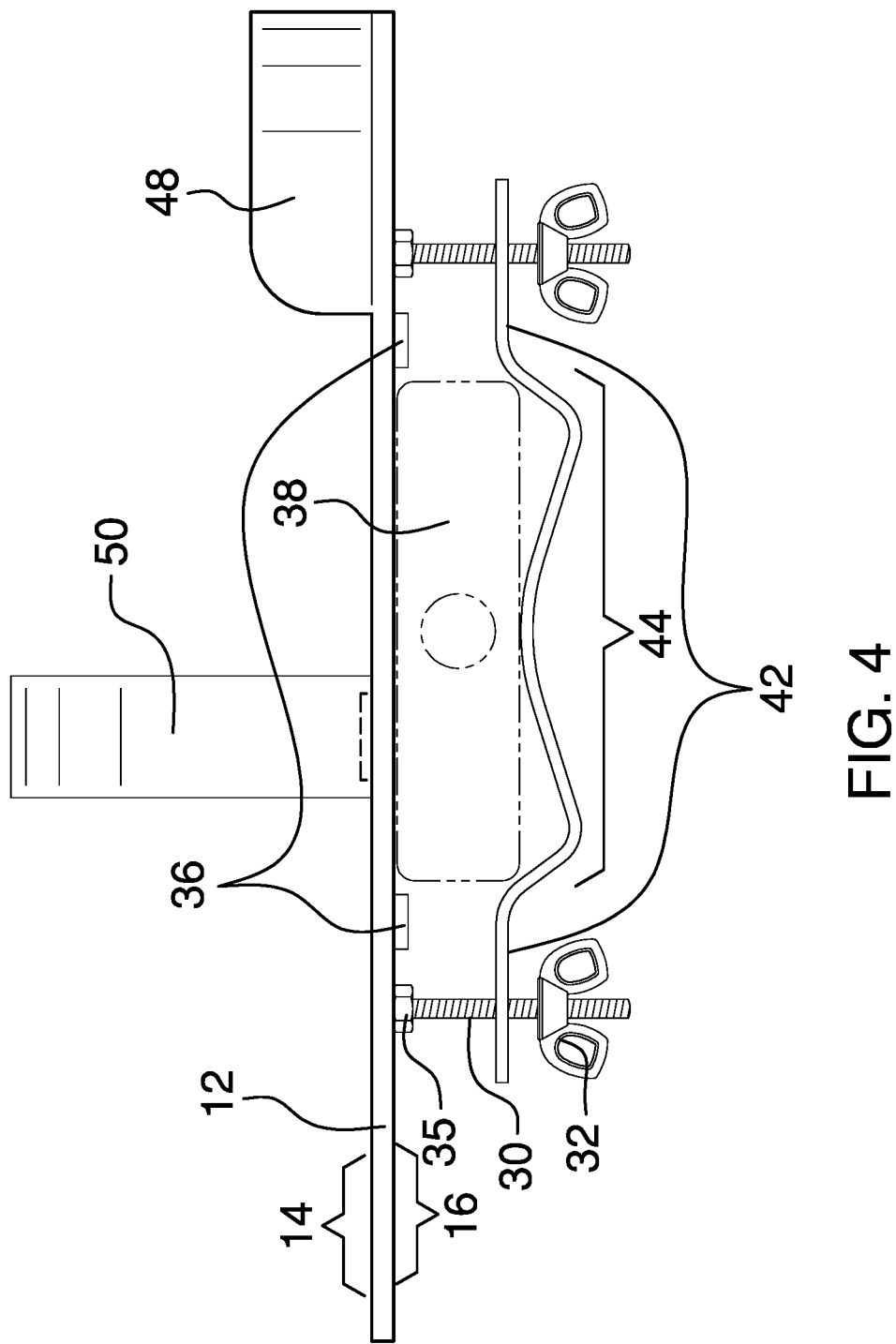
FIG. 4 is a side elevation view of an embodiment of the disclosure.
Figure 5:
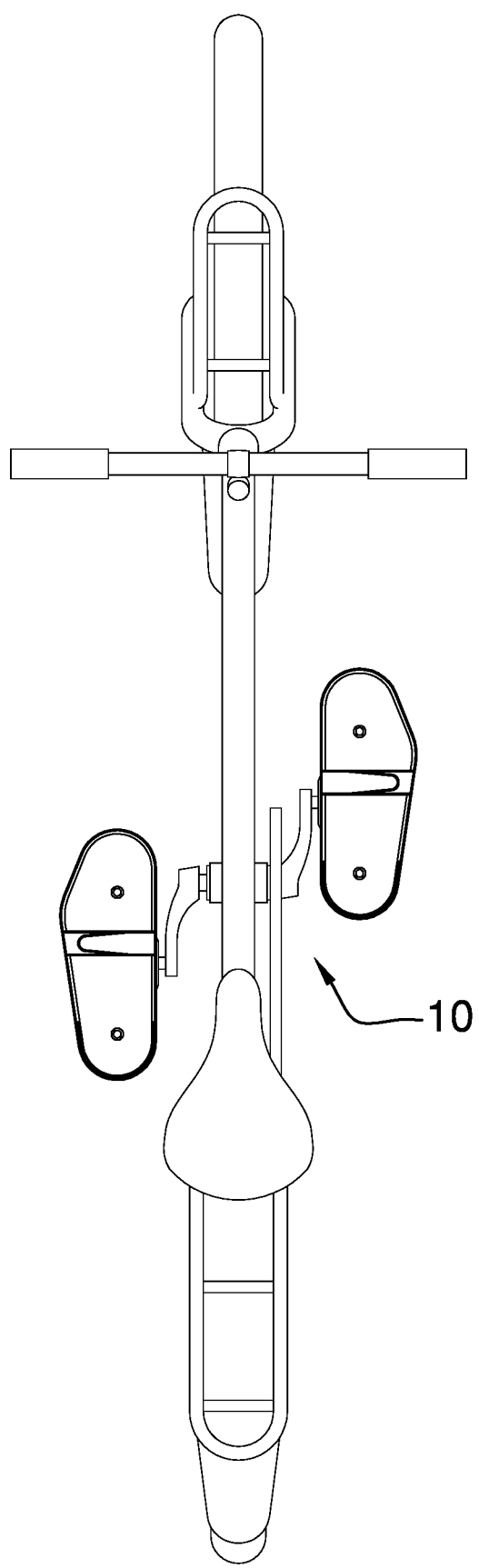
FIG. 5 is an in-use view of an embodiment of the disclosure.

A pedal holder 40 coupled to the pair of mounting posts 30. The pedal holder 40 may have a pair of outer planar portions 42 and a medial bent portion 44. The pedal holder 40 has a pair of receiving apertures 46 extending through the pair of outer planar portions 42 and selectively engageable with the pair of mounting posts 30. The pair of wing nuts 32 is then engaged to secure the pedal holder 40. The pedal holder 40 is configured to secure the pedal 38 against the platform bottom side 16. The medial bent portion 44 may be dimensioned and configured to contact the pedal 38 in at least three places as seen in FIG. 4.

A heel plate 48 is coupled to the platform 12. The heel plate 48 is coupled to the outer perimeter 18 along the heel portion 20 to further secure the user's shoe. A strap 50 is coupled to the platform 12. The strap 50 may include a first portion 52 coupled to the insole portion 24 and a second portion 54 coupled to the outsole portion 26. The strap may include a pair of strap mounts 56. Each strap mount 56 has a strap mount pad 58 and a pair of rivets 60 extending from the strap mount pad 58 through the strap to the platform 12. The first portion 52 has a first fastener 62 and the second portion 54 has a second fastener 64 selectively engageable with the first fastener 62. The first fastener 62 and the second fastener 64 may be, but are not limited to, hook and loop fasteners, snaps, buckles, and the like. The strap 50 is adjustable and configured to secure the user's shoe to the platform top side 14.

In use, the pedal holder 40 is engaged with the pair of mounting posts 30 and the wing nuts 32 is tightened until the pedal is secured against the platform bottom side 16 between the pair of cross tabs 36. The user then secures his or her foot on the platform top side 14 with the strap 50 and uses the exercise bike as normal but with extra support.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bike pedal shoe platform apparatus comprising:
   a platform having a platform top side, a platform bottom side, and an outer perimeter, the outer perimeter having a heel portion, a toe portion, an insole portion, and an outsole portion, the platform being dimensioned to receive the entirety of a user's shoe;
   a pair of mounting posts coupled to the platform, each mounting post extending perpendicularly from the platform bottom side;
   a pedal holder coupled to the pair of mounting posts, the pedal holder having a pair of receiving apertures selectively engageable with the pair of mounting posts, the pedal holder being configured to secure a pedal against the platform bottom side, the pedal holder having a pair of outer planar portions and a medial bent portion;
   a heel plate coupled to the platform, the heel plate being coupled to the outer perimeter along the heel portion; and
   a strap coupled to the platform, the strap being coupled to the outer perimeter and extending from the insole portion to the outsole portion, the strap being adjustable and configured to secure the user's shoe to the platform top side.

2. The bike pedal shoe platform apparatus of claim 1 further comprising a grip layer coupled to the platform, the grip layer being continuously coupled to the platform top side, and not formed on the outer perimeter.

3. The bike pedal shoe platform apparatus of claim 1 further comprising the strap including a first portion coupled to the insole portion and a second portion coupled to the outsole portion, the first portion having a first fastener and the second portion having a second fastener selectively engageable with the first fastener.

4. The bike pedal shoe platform apparatus of claim 1 further comprising the strap including a pair of strap mounts, each strap mount having a strap mount pad and a pair of rivets extending from the strap mount pad through the strap to the platform.

5. The bike pedal shoe platform apparatus of claim 1 further comprising each of the pair of mounting posts being threaded and including a wing nut.

6. The bike pedal shoe platform apparatus of claim 1 further comprising the medial bent portion being dimensioned and configured to contact the pedal in at least three places.

7. A bike pedal shoe platform apparatus comprising:
   a platform having a platform top side, a platform bottom side, and an outer perimeter, the outer perimeter having a heel portion, a toe portion, an insole portion, and an outsole portion, the platform being dimensioned to receive the entirety of a user's shoe;
   a pair of mounting posts coupled to the platform, each mounting post extending perpendicularly from the platform bottom side;
   a pedal holder coupled to the pair of mounting posts, the pedal holder having a pair of receiving apertures selectively engageable with the pair of mounting posts, the pedal holder being configured to secure a pedal against the platform bottom side;
   a heel plate coupled to the platform, the heel plate being coupled to the outer perimeter along the heel portion; and
   a strap coupled to the platform, the strap being coupled to the outer perimeter and extending from the insole portion to the outsole portion, the strap being adjustable and configured to secure the user's shoe to the platform top side; and
   a pair of cross tabs coupled to the platform, the pair of cross tabs being coupled to the platform bottom side between the pair of mounting posts, the pair of cross tabs being configured to limit movement of the pedal.

8. The bike pedal shoe platform apparatus of claim 7 further comprising each cross tab being obround.

9. A bike pedal shoe platform apparatus comprising:
   a platform having a platform top side, a platform bottom side, and an outer perimeter, the outer perimeter having a heel portion, a toe portion, an insole portion, and an outsole portion, the platform being dimensioned to receive the entirety of a user's shoe;

a grip layer coupled to the platform, the grip layer being continuously coupled to the platform top side excepting the outer perimeter;

a pair of mounting posts coupled to the platform, each mounting post extending perpendicularly from the platform bottom side, each of the pair of mounting posts being threaded and including a wing nut;

a pair of cross tabs coupled to the platform, the pair of cross tabs being coupled to the platform bottom side between the pair of mounting posts, each cross tab being obround, the pair of cross tabs being configured to limit movement of a pedal;

a pedal holder coupled to the pair of mounting posts, the pedal holder having a pair of outer planar portions and a medial bent portion, the pedal holder having a pair of receiving apertures extending through the pair of outer planar portions and selectively engageable with the pair of mounting posts, the pedal holder being configured to secure the pedal against the platform bottom side, the medial bent portion being dimensioned and configured to contact the pedal in at least three places;

a heel plate coupled to the platform, the heel plate being coupled to the outer perimeter along the heel portion; and a strap coupled to the platform, the strap including a first portion coupled to the insole portion and a second portion coupled to the outsole portion, the strap including a pair of strap mounts, each strap mount having a strap mount pad and a pair of rivets extending from the strap mount pad through the strap to the platform, the first portion having a first fastener and the second portion having a second fastener selectively engageable with the first fastener, the strap being adjustable and configured to secure the user's shoe to the platform top side.

\* \* \* \* \*